United States Patent
Roeder et al.

(10) Patent No.: US 10,141,582 B2
(45) Date of Patent: Nov. 27, 2018

(54) SOFC INTERCONNECT BARRIERS AND METHODS OF MAKING SAME

(71) Applicants: Jeffrey F. Roeder, Newtown, CT (US); Peter C. Van Buskirk, Brookfield, CT (US)

(72) Inventors: Jeffrey F. Roeder, Newtown, CT (US); Peter C. Van Buskirk, Brookfield, CT (US)

(73) Assignee: Sonata Scientific LLC, Bethel, CT (US)

( * ) Notice: Subject to any disclaimer, the term of this patent is extended or adjusted under 35 U.S.C. 154(b) by 151 days.

(21) Appl. No.: 14/975,810

(22) Filed: Dec. 20, 2015

(65) Prior Publication Data

US 2016/0181627 A1 Jun. 23, 2016

Related U.S. Application Data

(60) Provisional application No. 62/095,426, filed on Dec. 22, 2014.

(51) Int. Cl.
| | | |
|---|---|---|
| *H01M 8/0232* | (2016.01) | |
| *H01M 8/0236* | (2016.01) | |
| *H01M 8/0245* | (2016.01) | |
| *H01M 8/021* | (2016.01) | |
| *H01M 8/0215* | (2016.01) | |
| *H01M 8/0228* | (2016.01) | |
| *H01M 8/124* | (2016.01) | |

(52) U.S. Cl.
CPC ......... *H01M 8/021* (2013.01); *H01M 8/0215* (2013.01); *H01M 8/0228* (2013.01); *H01M 2008/1293* (2013.01)

(58) Field of Classification Search
CPC .. H01M 8/021; H01M 8/0215; H01M 8/0228; H01M 2008/1293
See application file for complete search history.

(56) References Cited

U.S. PATENT DOCUMENTS

| | | | |
|---|---|---|---|
| 9,670,586 B1* | 6/2017 | Deininger | ........... H01M 8/1253 |
| 2005/0158590 A1* | 7/2005 | Li | ........... C23C 16/403 |
| | | | 428/698 |

* cited by examiner

*Primary Examiner* — Brittany L Raymond
(74) *Attorney, Agent, or Firm* — Gregory Stauf

(57) ABSTRACT

A novel method to produce thin films spatially disposed on desired areas of workpieces is disclosed. Examples of include the formation of a yttria stabilized zirconia (YSZ) film formed on a desired portion of a stainless steel interconnect for solid oxide fuel cells by Atomic Layer Deposition (ALD). A number of methods to produce the spatially disposed YSZ film structures are described including polymeric and silicone rubber masks. The thin film structures have utility for preventing the reaction of glasses with metals, in particular alkali-earth containing glasses with ferritic stainless steels, allowing high temperature bonding of these materials.

17 Claims, 5 Drawing Sheets

SOFC INTERCONNECT BARRIERS AND METHODS OF MAKING SAME

CROSS REFERENCE TO RELATED APPLICATIONS

This application is a U.S. Utility application taking priority from U.S. Provisional application No. 62/095,426, filed Dec. 22, 2014, and herein incorporated by reference.

BACKGROUND OF THE INVENTION

References

W. N. Liu, X. Sun, E. V. Stephens, and M. A. Khaleel, "Investigation of Performance of SCN-1 Pure Glass as Sealant Used in SOFC," DOE Topical Report PNNL-19407, Pacific Northwest National Laboratories, March, 2010.

R. N. Singh, "Innovative Self Healing Seals for Solid Oxide Fuel Cells (SOFC)," 12th Ann. SECA Workshop, Pittsburgh, Pa., Jul. 28, 2011.

J. W. Stevenson, G. G. Xia, S. P. Choi, Y. S. Chou, E. C. Thomsen, K. J. Yoon, R. C. Scott, X. Li, and Z. Nie, "Development of SOFC Interconnects and Coatings," 12th Annual SECA Workshop, Pittsburgh, Pa., Jul. 26-28, 2011.

The present invention relates to the formation of barrier layers on stainless steel substrates to reduce reaction between glass seals and the substrate.

Solid oxide fuel cells (SOFC) represent a class of devices that convert hydrogen in various forms to electricity using electrochemical reaction with oxygen. The waste comprises water. SOFC's one of a growing number of clean energy technologies. A critical reliability risk originates in the glass seals that connect individual cells within the fuel cell stack. Each SOFC comprises an anode, electrolyte, and cathode. Anodes are typically Ni containing cermets, electrolytes are typically yttria stabilized zirconia, or related oxygen conductors, and cathodes typically are lanthanum-strontium based ceramics, including lanthanum strontium manganite and lanthanum strontium iron cobaltite. State of the art fuel cell stacks utilize ferritic stainless steel sheets as interconnect plates and manifolding between the fuel and air chambers, with mechanical bonding between plates using alkali earth containing silicate glass formulations.

Despite generally favorable behavior, the glass/metal seal has one distinct problem that must be overcome for long-term reliability. During operation at elevated operating temperatures (650-850° C.), alkali-earth components of the glass (e.g., Ba, Sr, and Ca) react with Cr in the stainless steel to form intermediate phases, e.g., $SrCrO_4$. As this occurs, the alkali-earth component of the glass is depleted via diffusion, leading to formation of voids in the glass, which subsequently coalesce to cause leaks in the hermetic seal. (A previous interconnect barrier layer scheme, utilizing solely aluminide based barriers, proved ineffective at mitigating this issue.) It has been determined that ytrria stabilized zirconia (YSZ) does not react with stainless steel or the glass, suggesting that it should be an excellent diffusion barrier to prevent reactions between the sealing glass and the stainless steel interconnect.

Roughness of the steel interconnect presents a significant challenge to barrier formation. Pacific Northwest Laboratories has recommended sand blasting to remove the mill scale and provide a reliable surface from which the protective chromium oxide does not spall at elevated temperature. The surface of the steel is quite rough with numerous small protrusions, and with areas that may have re-entrant angles with respect to the surface. The ideal barrier would be thin, dense and fully continuous over such a surface and free of defects so that surface and defect driven diffusion pathways are minimized. Regardless of the surface treatment, the surface of the stainless steel is microscopically rough due to scratches, abrasion, and the like.

Numerous thin and thick film methods are known, but most have limited ability to provide a highly dense conformal coating over rough surfaces. Wet methods (e.g., sol-gel, pastes or screen printing) require sintering and are non-conformal. Achieving high density is also a challenge with these methods, which is exacerbated with $ZrO_2$ due to high sintering temperatures (~1700° C.). Plasma or thermal sprays result in a polycrystalline, splat-like microstructure with poor conformality. Evaporation and sputtering have no and limited conformality, respectively. MOCVD offers a somewhat higher degree of conformality but requires high temperatures. Accordingly, it would be a significantly advantageous improvement to produce a highly dense, conformal barrier layer.

It is noted that while SOFC interconnects represent one application where such a barrier may be advantageously used, many other similar applications exist, for example, alloys exposed to high temperature corrosive environments such as turbine blades.

SUMMARY DISCLOSURE OF INVENTION

The present invention relates to the fabrication of highly dense barrier coatings on ferritic stainless steels to reduce reaction with glasses containing alkali-earth elements.

In one aspect, the invention relates to the use of atomic layer deposition (ALD) to deposit a uniform layer of zirconia based ceramic film on ferritic stainless steel.

In another aspect, the invention relates to the use of zirconia based ceramic films fabricated in such a manner as a reaction blocking layer with alkali-earth containing glasses.

In another aspect, the invention relates to the use of masking to restrict deposition of the barrier layer to desired areas on the workpiece.

DETAILED DESCRIPTION OF THE INVENTION

The present invention relates to the fabrication of zirconium oxide based ceramic barrier films on stainless steel by ALD with a complimentary method of limiting deposition of the film to desired areas.

Figure 1:
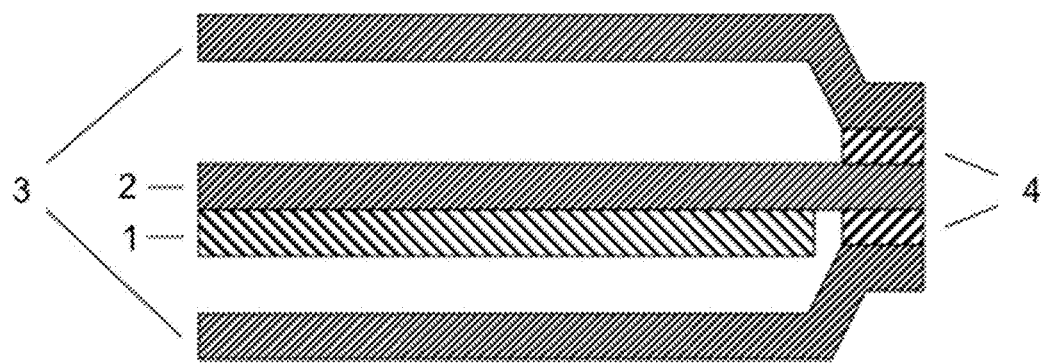
FIG. 1 is a schematic of a solid oxide fuel cell interconnect structure.

FIG. 1 shows a schematic of a portion of an SOFC stack. The individual SOFC 1 is attached to the interconnect plate 2. Other ferritic stainless steel plates form gas manifolds 3 in proximity to the SOFC. The plates are mechanically bonded using alkali earth containing silicate glass formulations to provide a hermetic seal 4. The glass formulations remain vitreous at operating temperatures to provide mechanical compliance, and can therefore react with the metallic plates. Ferritic stainless steel and other metallic substrate and accompanying glass or other reactive solid formulations have been carefully engineered for oxidation resistance and the ability to accommodate thermal expansion, respectively. Ferritic stainless steels are characterized by a body centered cubic crystal structure, 10.5-29 atomic % chromium alloying, low nickel content (<5 atomic %) and are used in high temperature cost-sensitive applications like catalytic converters. Examples include American Iron and Steel Institute (AISI) 440 and 441 (manufactured by Allegheney-Ludlum), Crofer APU22, Hitachi ZMG232L, and Sandvik Sanergy HT 441. Viscous seal glasses include SEM-CON SC-1 and the like.

In one aspect, the invention relates to the use of ALD to deposit zirconium oxide based films. Alloying additions to the zirconia films include fluorite phase stabilizing elements such as yttrium (Y) and scandium (Sc). These stabilizing elements may be added in ranges from 4 mole percent to 8 mole percent for $Y_2O_3$, for example, to the zirconia in order to stabilize the zirconia over a wider temperature range. Grading of the YSZ through the thickness of the film may take place, with some regions having lower concentrations of the stabilizing element and other regions having higher concentrations of the stabilizing element.

Using ALD, interlayers may also be added to the zirconium oxide based films, for example, aluminum oxide ($Al_2O_3$), forming a nanolaminate structure of alternating sublayers of aluminum oxide and zirconia, either or both materials of which may be doped with additional stabilizing elements. The nanolaminate may be a bilayer, having just two layers of different materials, or may have many alternating sublayers to form the overall thin film barrier structure. Grading of any sublayer within the nanolaminate may take place, with some regions of the sublayer having lower concentrations of the stabilizing element and other regions having higher concentrations of the stabilizing element. Use of one or more aluminum oxide sublayers in the nanolaminate may have benefits including, but not limited to, adhesion, nanolaminate stabilization, and diffusion prevention.

The oxide ALD process uses pulses of a metal cation containing precursor and an oxidizing agent. The pulses are separated by pulses of inert gas to prevent reaction in the gas phase. A series of pulses characterized by a precursor dose pulse, purge pulse, oxidizer pulse, and purge pulse is known as an ALD cycle. The process may be carried out under constant flow, or the gas flow may be stopped at intervals during dosing to allow diffusion of species.

In the deposition process, each ALD metal cation layer may use a mixture of precursors to produce multielement films, such as in the case of the previously mentioned yttria stabilization of zirconia, or different ratios of pulses may be used to produce a final film which contains multiple elements. In this latter case, where different ratios of pulses are used, one might, for example, use 9 pulse cycles of a zirconium precursor and oxidizer followed by 1 pulse cycle of yttrium precursor and oxidizer to produce a film containing approximately 10% of yttria in zirconia. Partial saturation of metal cation layers, each cycle with or without full reaction with oxidizers, may also be used to allow this composition mixture with fewer overall cycles. A heat treatment or anneal may then be used to interdiffuse the layers and produce a desired overall mixture such as YSZ. Note that a barrier layer on a metallic substrate may be directly in contact with the metallic substrate material, or may be over other layers which may be present on the substrate for various reasons such as, but not limited to, adhesion, nucleation, thermal expansion coefficient matching or crystallization of the barrier layer.

Metalorganic precursors for yttrium, scandium and zirconium include a number of metalorganic compounds, including ketonates, iminates, alkoxides, amides, amidinates, guanidinates, and cyclopentadienyls. In general, many of these compounds are useful for ALD. Specifically, amides of Zr show excellent reactivity with water as an oxidizing agent. Useful amide sources for Zr include tetrakisdimethylamido Zr (TDMAZ), tetrakisdiethylamido Zr (TDEAZ), and tetrakisethylmethylamido Zr (TEMAZ). Yttrium and scandium sources with good reactivity for water include triscyclopentadienyl Y ($Y(Cp)_3$), trismethylcyclopentadienyl Y ($Y(Me-Cp)_3$), trispropylcyclopentadienyl Y ($Y(Pr-Cp)_3$), triscyclopentadienyl Sc ($Sc(Cp)_3$), trismethylcyclopentadienyl Sc ($Sc(Me-Cp)_2$), and trisproylcyclopentadienyl Sc ($Sc(Pr-Cp)_2$). Other oxidants may include ozone or oxygen plasma.

ALD may be carried out with solid or liquid sources held in bubblers through which a carrier gas is flowed to convey the source to the deposition chamber. The sources may also be dissolved in an organic solvent as individual sources or combined together. Key criteria of a solvent system are (1) high boiling point to reduce the chance of flash off of the solvent, (2) high solubility for the compound, (3) low cost. Useful hydrocarbon solvents may include, for example: octane, decane, isopropanol, cyclohexane, tetrahydrofuran, and butyl acetate or mixtures comprising these and other organic solvents. Lewis base adducts may also be incorporated as additions to the solvent(s) for beneficial effects on solubility and to prevent possible oligimerization of the precursor molecules. Examples of useful Lewis Bases include polyamines polyethers, crown ethers, and the like. Pentamethylenediamine is a one example of a polyamine. Examples of polyethers include various glymes such as mono-, di-, tri-, and tetraglyme.

Turning to the deposition process, we note that most ALD processes exhibit what is known as an ALD window with respect to temperature. In this temperature range, growth of the film is surface mononlayer saturation limited. The practical result is that deposition (thickness) per ALD cycle is the same, as long as sufficient material is provided to the surface. After saturation, further supply of material in the gas phase does not increase growth per cycle. The primary objective in the present invention is the formation of a film of as conformal in nature as possible, i.e., with a uniform thickness over asperities. Crystallinity is also preferred. The upper end of the ALD window temperature range offers a good mix of conformality and the potential for good crystallinity. Post-deposition annealing in an oxygen containing atmosphere may also be used to promote crystallinity in the film.

The deposition system may have an automated throttle valve that allows pressure to be controlled independently of flow. In this way, residence times can be manipulated more directly. The hot-wall type reactor is one type of reactor that may be used to deposit the subject films. Alternatives include batch hot-wall reactor or warm-wall showerhead type reactors.

Process conditions favorable for ALD of zirconia based films are in the temperature range of 150-250° C. with pressures in the range of 1-5 Torr. Surface preparation (termination) can be very important in ALD. Pre-treatments to promote uniform nucleation include aqueous acids/bases compatible with the substrate and that result in —H or —OH termination of the substrate surface.

Embodiments for ALD of zirconia based films on ferritic stainless steel include the following examples.

Example 1: A yttria stabilized zirconia film is deposited on ferritic stainless steel using TDEAZ and Y(Cp)$_3$ at 220° C. Reactor pressure is 2 Torr. Dose times for TDEAZ, Y(Cp)$_3$ and water vapor are 5 seconds. Purge times are 10 seconds. Nitrogen is used to transport the precursors to the deposition chamber and as the inert purge. A number of ALD cycles are used to deposit the film, with a ratio of 6 Zr cycles to 1 Y cycle. Interspersed in the ALD cycles are cycles of Al$_2$O$_3$ deposited using trimethylaluminum (TMA). The overall film thickness is between 5 and 500 nm.

Example 2: A yttria stabilized zirconia film is deposited on ferritic stainless steel using TDEAZ and Y(Me-Cp)$_3$ at 230° C. Reactor pressure is 1 Torr. Dose times for TDEAZ, Y(Me-Cp)$_3$ and water vapor are 5 seconds. Purge times are 10 seconds. Nitrogen is used to transport the precursors to the deposition chamber and as the inert purge. A number of ALD cycles are used to deposit the film, with a ratio of 6 Zr cycles to 1 Y cycle. A hydroxide terminating treatment is used before ALD. The ferritic stainless steel has a Cr$_2$O$_3$ surface layer that is exposed to dilute nitric acid for 10 seconds at room temperature. The surface is rinsed in water and then exposed to a mixture of sulfuric acid and 30% hydrogen peroxide-water in a 3:1 ratio for 10 seconds. The surface is then rinsed and dried. The Y dose is applied first to the substrate, followed by Zr. The overall film thickness is between 5 and 500 nm.

Figure 2:
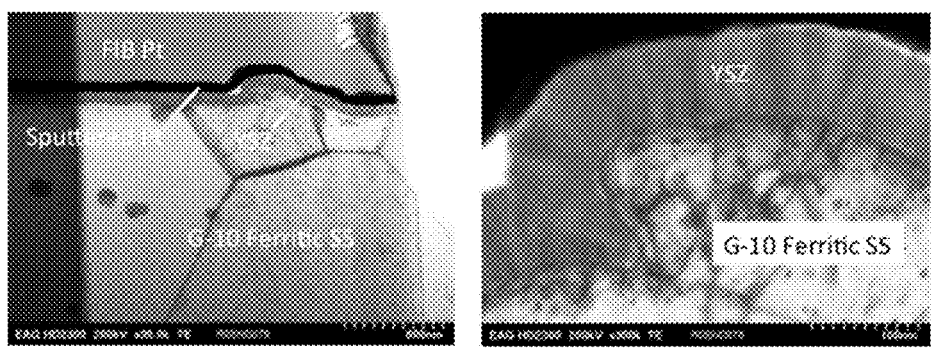
FIG. 2 is a cross-sectional electron micrograph image of a YSZ film on ferritic stainless steel produced by atomic layer deposition (ALD).

Example 3: A yttria stabilized zirconia film is deposited on ferritic stainless steel using TDMAZ and Y(Me-Cp)$_3$ at 230° C. Reactor pressure is 1 Torr. Dose times for TDMAZ, Y(Me-Cp)$_3$ and water vapor are 5 seconds. Purge times are 10 seconds. Nitrogen is used to transport the precursors to the deposition chamber and as the inert purge. A number of ALD cycles are used to deposit the film, with a ratio of 6 Zr cycles to 1 Y cycle. A dense, highly conformal YSZ film deposited on ferritic stainless steel using 798 ALD cycles is shown in the SEM micrographs of FIG. 2. The film thickness is approximately 80 nm.

Figure 3:
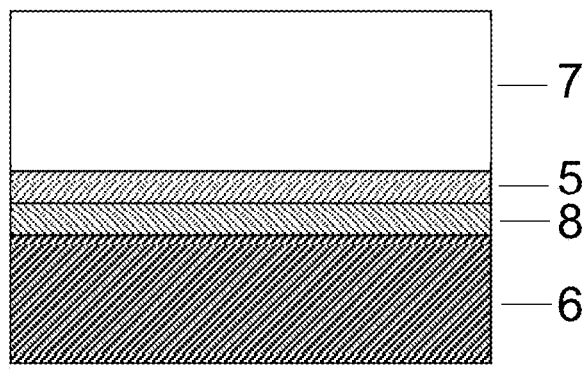
FIG. 3 is a schematic of the interconnect-glass interface with a barrier layer.

In another aspect, the invention relates to the use of zirconia based ceramic films fabricated in such a manner as a reaction blocking layer with alkali-earth containing glasses. In FIG. 3, a YSZ layer 5 is disposed between the ferritic stainless steel 6 and an alkali-earth containing glass 7. A passivating chromium oxide layer 8 may be present on the surface of the stainless steel 6. The YSZ film is produced by ALD.

Figure 4:
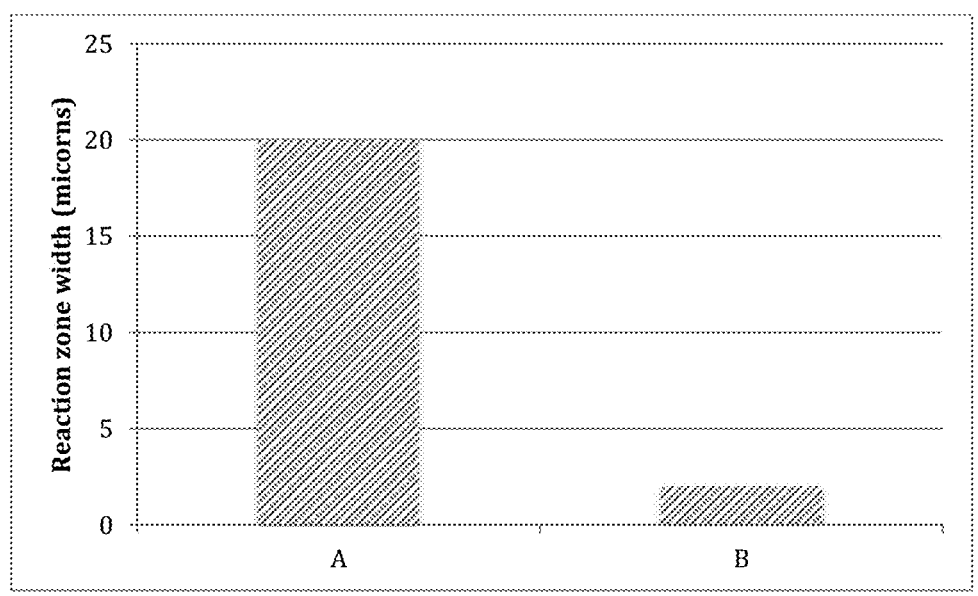
FIG. 4 is a comparison of reaction zone thicknesses in diffusion couples of ferritic stainless steel and alkali-earth containing glass, with and without YSZ barriers after annealing at 850° C. for 260 hours.

FIG. 4 shows the thickness of reaction zones between stainless steel and glass, where less reaction (a thinner layer) is better. After annealing at 850° C. for 260 hours, the extent of reaction of the stainless steel with the glass is characterized by examining the width of the reaction zone by cross-sectional analysis of a polished section where the extent of reaction is shown for a glass-stainless steel diffusion couple with (A) and without a YSZ barrier deposited by ALD. The YSZ barrier decreases the extent of reaction by a factor of 10. Different combinations of barrier layer materials, thickness, nanocomposite multilayer stacking, metallic substrate and reactive solid, as well as reaction temperature and time may vary the factor of reduction of inter-reaction between the metallic substrate and the reactive solid. It is desirable to achieve at least a reduction of a factor of 2, more desirable to achieve a reduction of a factor of 5, and in a preferred embodiment achieve a reduction of a factor of 10 or more. The barrier may be useful for protecting other metals from reaction with deleterious cations in applications outside of SOFCs.

In another aspect, the invention relates to the use of masking to restrict deposition of the barrier layer to desired areas on the workpiece. It is well known that ALD processes coat workpieces quite uniformly and typically over all exposed surfaces. It is therefore a great advantage to devise a scheme by which only a portion of the surface is coated, specifically in a desired area. For SOFC interconnects, the desired area is the perimeter of the interconnect where the glass seal is formed. It is desired not to coat the central area of the interconnect where electrical conductivity is needed. A thermally stable mask is used. The low thin film deposition temperature achievable via use of ALD in this invention is particularly advantageous in allowing use of inexpensive, easily shaped, flexible and reusable mask materials such as elastomers to carry out this masking process.

Example 4: A self-adhesive polyimide film is applied to the substrate prior to deposition of YSZ by ALD. After deposition, the polyimide film is peeled off.

Figure 5:
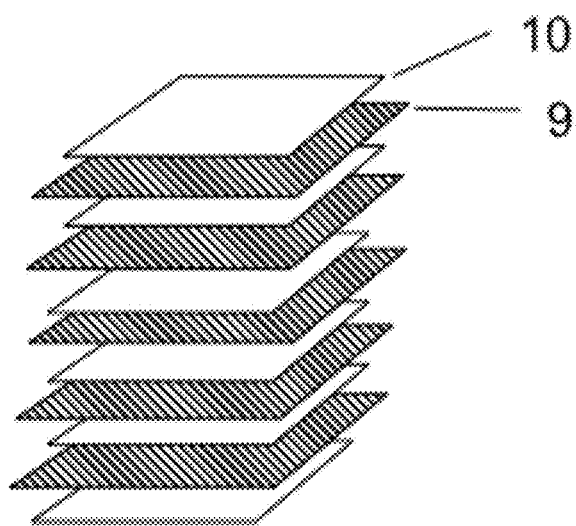
FIG. 5 is a schematic of a masking method to prevent deposition of barrier layer in a region of the substrate.

Example 5: FIG. 5 shows a sandwich structure of interleaved multiple ferritic stainless steel plates 9 and silicone rubber sheets 10. This structure is placed in a clamping mechanism and compressed so that the masks are in intimate contact with the substrates. An ALD process for YSZ is carried out on the assembly at 230° C. for 800 cycles. After deposition, the silicone is removed. The area of each sheet 9 which was masked by silicone rubber sheet 10 does not have a YSZ coating, as it was protected from reaction with the precursors or oxidizer during the ALD process.

Multiple substrates and masks may be stacked to allow many substrates to be coated simultaneously. The masks may be continuous sheets of silicone rubber or gasket like sheets where a perimeter seal protects and interior area. The masks may be clamped outside of the ALD process (ex-situ) or inside the ALD process chamber (in-situ) by suitable mechanisms such as a camshaft actuated via a rotary vacuum feed-through. Mask materials may also be applied or attached to the substrate as liquids or viscous liquids by dispensing or flowing the mask material onto the substrate, which case the shaping of the mask structure may be carried out by methods such as lithography, stencils, stamps, etc.

The subject invention may be embodied in the forgoing examples that are by no means restrictive, but intended to illustrate the invention.

What is claimed is:

1. A barrier layer on a metallic substrate, the metallic substrate comprising a first portion adjacent to a vitreous reactive solid and a second portion adjacent to an electrode, the barrier layer being on the first portion between the metallic substrate and the vitreous reactive solid, the barrier layer not being between the second portion and the electrode, the barrier layer substantially reducing chemical reaction between the metallic substrate and the reactive solid, and the barrier layer comprising an insulating thin film material deposited by atomic layer deposition.

2. The barrier layer of claim 1, wherein the barrier layer reduces chemical reaction by at least a factor of 10.

3. The barrier layer of claim 1, wherein the barrier layer reduces chemical reaction by at least a factor of 5.

4. The barrier layer of claim 1, wherein the barrier layer comprises at least one of a group III oxide and zirconia.

5. The barrier layer of claim 1, wherein the barrier layer comprises at least one of yttria and zirconia.

6. The barrier layer of claim 5, wherein the barrier layer comprises layers of each of yttria and zirconia, each layer deposited by an atomic layer deposition cycle.

7. The barrier layer of claim 6, wherein the layers of each of yttria and zirconia are deposited in a ratio of between and including 4 cycles of zirconia to 1 cycle of yttria and 8 cycles of zirconia to 1 cycle of yttria.

8. The barrier layer of claim 6, wherein the layers of each of yttria and zirconia are deposited in a ratio of between and including 5 cycles of zirconia to 1 cycle of yttria and 7 cycles of zirconia to 1 cycle of yttria.

9. The barrier layer of claim 1, wherein the barrier layer comprises at least one of yttria and zirconia and the first atomic layer is yttria.

10. The barrier layer of claim 9, wherein up to the first 15 atomic layers are yttria.

11. The barrier layer of claim 1, wherein the barrier layer comprises at least one of yttria and zirconia and further comprises an alumina layer.

12. The barrier layer of claim 1, wherein the metallic substrate comprises ferritic stainless steel.

13. The barrier layer of claim 1, wherein the reactive solid comprises an alkali-earth containing glass.

14. The barrier layer of claim 1, wherein the metallic substrate and reactive solid comprise a portion of the structure of a solid oxide fuel cell.

15. The barrier layer of claim 1, wherein the substantial reduction of the chemical reaction between the metallic substrate and the reactive solid by the barrier layer is in the temperature range from approximately 650° C. and 850° C.

16. The barrier layer of claim 15, wherein the barrier layer reduces chemical reaction by at least a factor of 10.

17. The barrier layer of claim 15, wherein the barrier layer reduces chemical reaction by at least a factor of 5.

* * * * *

UNITED STATES PATENT AND TRADEMARK OFFICE
CERTIFICATE OF CORRECTION

PATENT NO. : 10,141,582 B2
APPLICATION NO. : 14/975810
DATED : November 27, 2018
INVENTOR(S) : Roeder et al.

Page 1 of 1

It is certified that error appears in the above-identified patent and that said Letters Patent is hereby corrected as shown below:

In the Specification

Column 1, Line 11, insert:
--ACKNOWLEDGEMENT OF GOVERNMENT SUPPORT
This invention was made with government support under contract #DE-SC0011274, awarded by the U.S. Department of Energy. The government has certain rights in the invention.--

Signed and Sealed this
Ninth Day of July, 2019

Andrei Iancu
*Director of the United States Patent and Trademark Office*